H. G. BUTZOW.
DUST CAP FOR VALVE STEMS.
APPLICATION FILED APR. 25, 1917.
1,252,085. Patented Jan. 1, 1918.
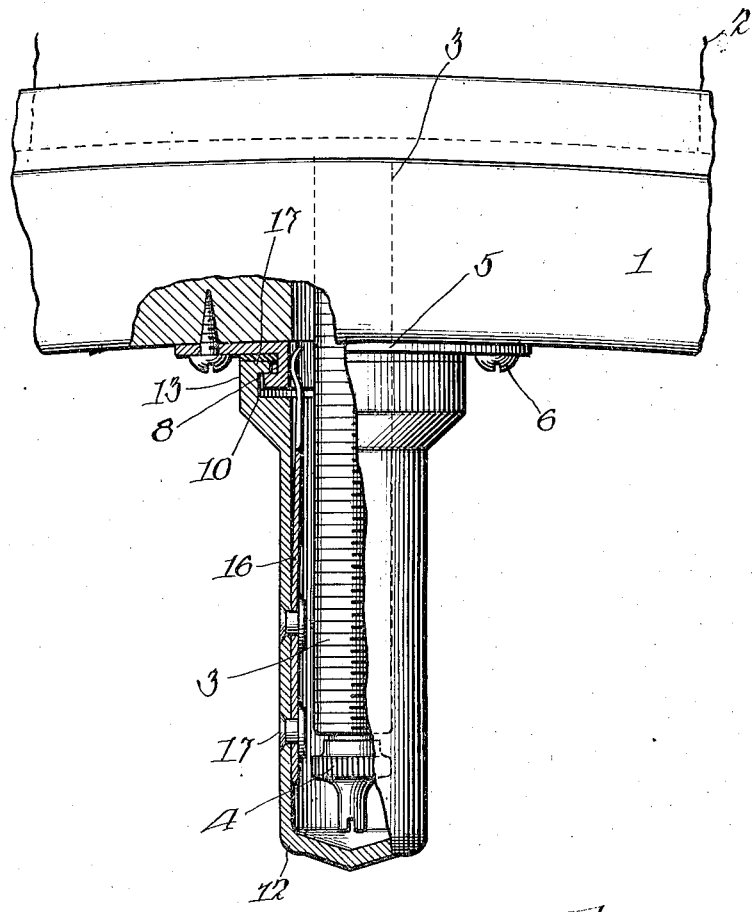
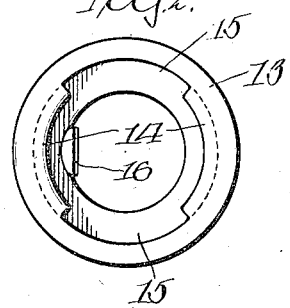
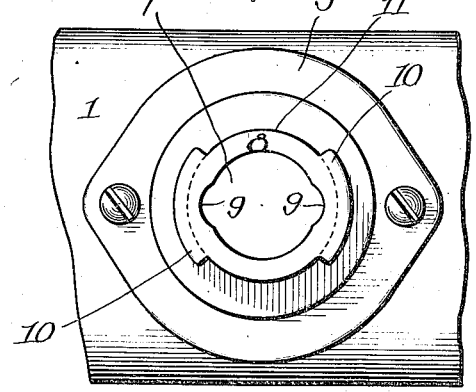
Inventor:
Henry G. Butzow.

UNITED STATES PATENT OFFICE.

HENRY G. BUTZOW, OF SYCAMORE, ILLINOIS.

DUST-CAP FOR VALVE-STEMS.

1,252,085.   Specification of Letters Patent.   Patented Jan. 1, 1918.

Application filed April 25, 1917. Serial No. 164,328.

*To all whom it may concern:*

Be it known that I, HENRY G. BUTZOW, a citizen of the United States, residing at Sycamore, county of Dekalb, State of Illinois, have invented certain new and useful Improvements in Dust-Caps for Valve-Stems, of which the following is a specification.

The essential object of this invention is to provide a protecting-cap or dust-cap such as is used to cover over and protect the exposed end of the valve-stem, which stem projects from the inflated tire of an automobile, bicycle, or other vehicle through the felly of the wheel, and the dust-cap hereinafter described is so constructed that it is adapted to be readily removed from or replaced upon the valve-stem. When in place, the dust-cap will protect the valve and valve-stem from the water and dirt, but the arrangement of the parts and their construction is such that the dust-cap hereinafter described cannot become so tightly wedged in place as to require a wrench or other tool for its removal as often happens when screw-threaded dust-caps are employed; neither can the dust-cap be accidentally dislodged or displaced because of the rotation of the wheel and the movement of the vehicle. In other words, this invention serves the two-fold purpose of providing a cap which cannot become unseated or removed accidentally and which cannot, on the other hand, become so tightly wedged or locked in place as to necessitate the use of a wrench or tool in order to remove the dust-cap.

In the drawings, Figure 1 depicts a fragment of the felly and outer casing or wheel, the valve, valve-stem, and dust-cap being in place thereupon and a portion of the dust-cap being broken away to depict the interior construction; Fig. 2 is a view of the open end of the dust-cap looking downwardly from above in Fig. 1; and Fig. 3 is a bottom plan view of the base or plate which is secured to the felly and to which the removable cap itself is secured.

The felly 1, which may be made of wood or metal, supports the tire 2 in the customary manner, and the valve-stem 3 communicates with the interior of the tube of the tire 2. Said stem 3 is ordinarily made of some flexible material and has its open end sealed by a valve 4, the lower end of the flexible valve-stem 3 being adapted to receive the pump or pump connection when the tire is to be inflated. The parts heretofore described are all old and well known in the art and no novelty is claimed therefor, the novelty of this invention residing in the means for protecting and incasing the valve-stem 3.

The base-plate 5 is secured by screws to the felly 1 and said base-plate is provided with a central perforation 7 through which the valve-stem 3 is adapted to pass. The annular rim 8 encircles said central perforation 7 and is recessed in two places at 9, the recesses 9 being formed upon the interior wall of the flange 8. Upon the exterior wall of the flange 8 are the annular lips or tongues 10 which project outwardly or away from the central perforation 7, spaces 11 being left between the two lips 10.

The cap 12 itself is substantially cylindrical in form and is of a length and diameter suitable to permit it to fit over and incase the valve-stem 3. At one end, the cap 12 bears the flange 13, and said flange 13 carries the two interiorly-projecting annular lips or tongues 14, there being spaces 15 intermediate the lips 14. A leaf-spring 16 is riveted or bolted at 17 to the wall of the cap 12.

When it is desired to assemble the device as shown in Fig. 1, the cap 12 is pushed upwardly and into engagement with the base-plate 5 and is then rotated until the interiorly-projecting lips 14 upon the cap 12 lock with the outwardly-projecting lips 10 upon the base-plate 5, and these two coöperating and co-acting pairs of annular lips hold the dust-cap 12 in position. The leaf-spring 16, one end of which seats in a recess 9, will keep the cap locked in place and will prevent its accidental rotation and dislodgment. When it is desired to remove the cap 12 for the purpose of inflating the tire, the cap is rotated until the interiorly-projecting lips 14 come opposite the spaces 11, at which time the outwardly-projecting lips 10 will be opposite the spaces 15 and then the cap can simply and quickly be pulled off. If desired, a gasket 17 made of any resilient material or packing may be interposed between the open mouth of the cap 12 and the base-plate 5 so as to make the device as nearly air-tight as possible. Obviously, the annular lips 10 must be spaced apart from the base-plate 5 a sufficient distance to permit the annular lips or flanges 14 to be received intermediate the lips 10 and the gasket 17. The spaces 11 and 15 must be large enough to permit the passage therethrough of the annular lips 14 and 10, respectively, and it is desirable, also, to provide the recesses 9 with curved edges in order to permit the free end of the leaf-spring 16 to ride out of the recess 9 when the cap 12 is rotated. The other details of construction will be sufficiently evident to those skilled in the art without further detailed description in this specification.

I claim as my invention:

A dust-cap for valve-stems comprising a fixed base-plate surrounding the stem, a cap, said plate and cap having interengaging lips which prevent movement of the cap from the tongue axially of the stem, and yieldable means for preventing rotation of the cap on the plate comprising a leaf-spring secured against the inner surface of the cap, substantially paralleling the axis thereof and engaging a recess formed in the plate, the sides of the spring and recess being beveled and in contact laterally to facilitate disengagement.

HENRY G. BUTZOW.